United States Patent
Sherman

[11] 3,712,641
[45] Jan. 23, 1973

[54] STEERING SYSTEM FOR TRAILERS

[75] Inventor: Donald W. Sherman, Orchard Lake, Mich.

[73] Assignee: Dana Corporation, Toledo, Ohio

[22] Filed: Nov. 17, 1971

[21] Appl. No.: 199,607

[52] U.S. Cl............................280/426, 280/442
[51] Int. Cl. ...........................................B62d 53/00
[58] Field of Search......................................280/426

[56] References Cited

UNITED STATES PATENTS

| | | | |
|---|---|---|---|
| 2,223,436 | 12/1940 | Winn | 280/426 |
| 2,793,052 | 5/1957 | Googe | 280/426 |
| 2,925,285 | 2/1960 | Haas | 280/426 |
| 2,959,428 | 11/1960 | Felburn | 280/426 |

FOREIGN PATENTS OR APPLICATIONS

| | | | |
|---|---|---|---|
| 74,521 | 8/1952 | Denmark | 280/426 |
| 215,469 | 5/1924 | Great Britain | 280/426 |
| 800,379 | 8/1958 | Great Britain | 280/426 |

*Primary Examiner*—Leo Friaglia
*Attorney*—Harold David Shall et al.

[57] ABSTRACT

An improved steering system for use in a tractor-trailer combination wherein spaced parallel longitudinally extending links interconnect a first transversely extending control arm pivotally connected to the front of the trailer to a second transversely extending control arm cooperating with a steerable tandem axle assembly supporting the rear of the trailer with a limiting connection provided between the fifth wheel of the tractor and the first transversely extending control arm to effect initial simultaneous turning of the tractor and trailer axle up to a predetermined degree of relative movement between the tractor and trailer and subsequently allowing the tractor to turn in relation to the trailer beyond this point without effecting greater steering movement of the trailer axle. The limiting connection comprises a pair of force transferring members in the form of a housing secured to the underside of the first transversely extending control arm and a rod telescopically received in the housing with the latter being operatively connected to an actuating or steering member engageable in the V-slot of the fifth wheel so as to be unitarily rotatable therewith.

6 Claims, 4 Drawing Figures

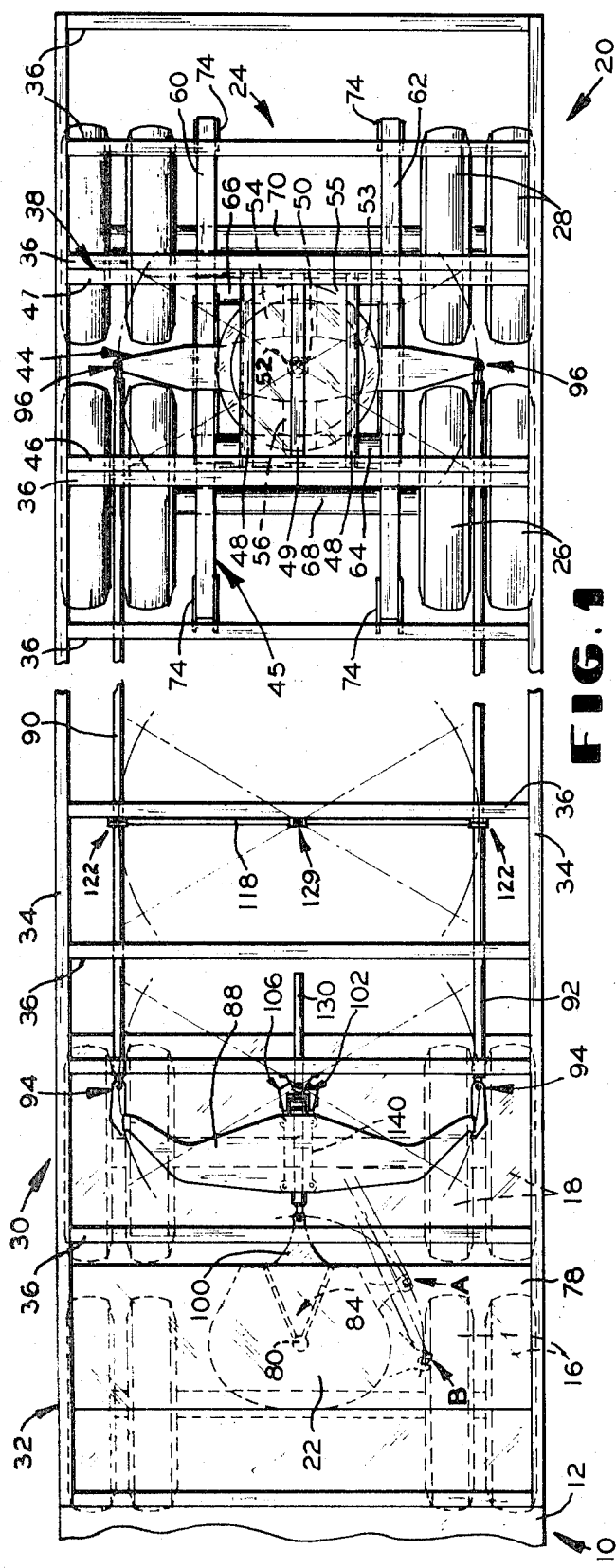
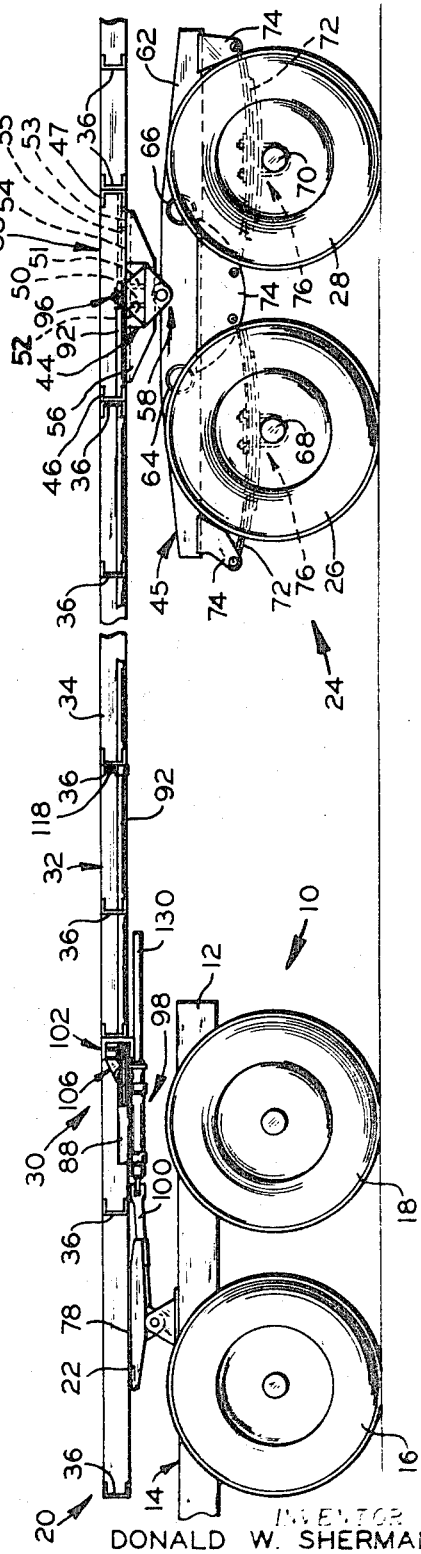

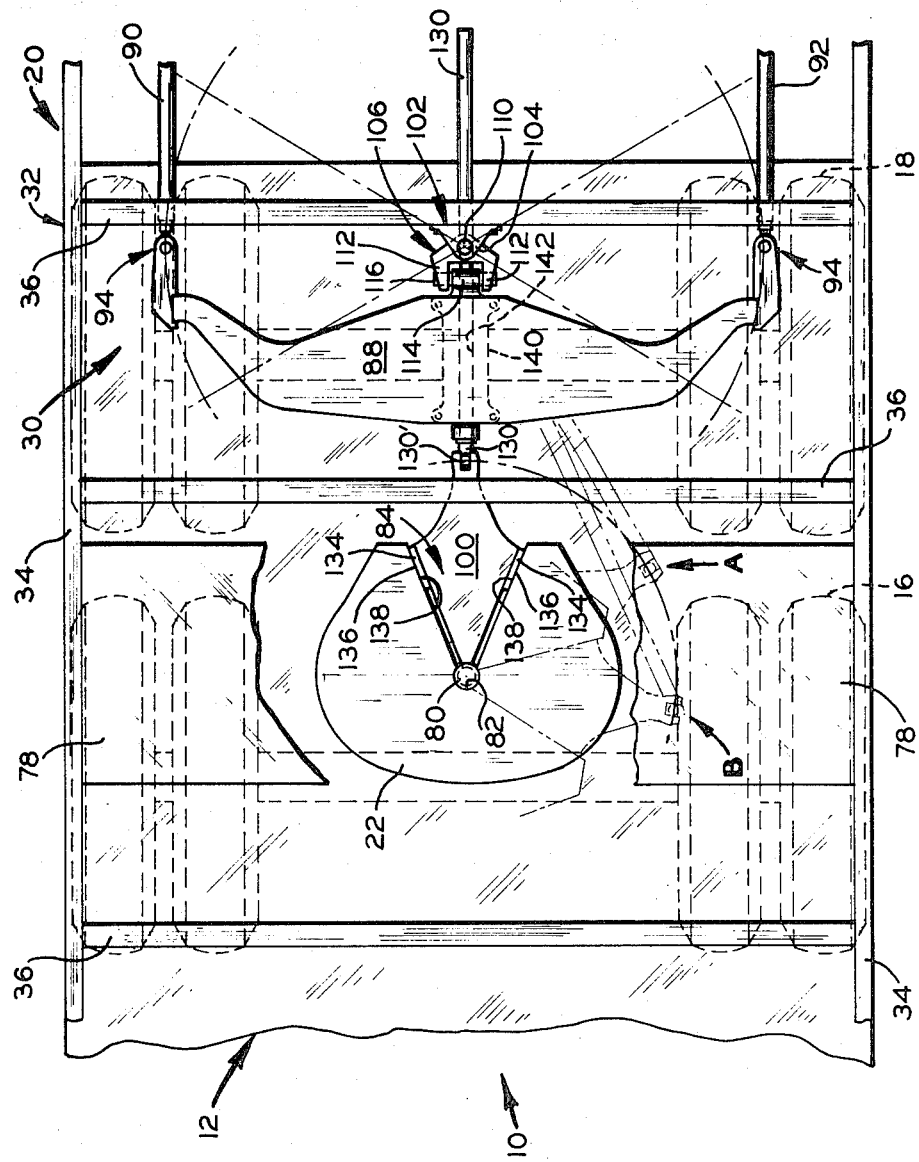

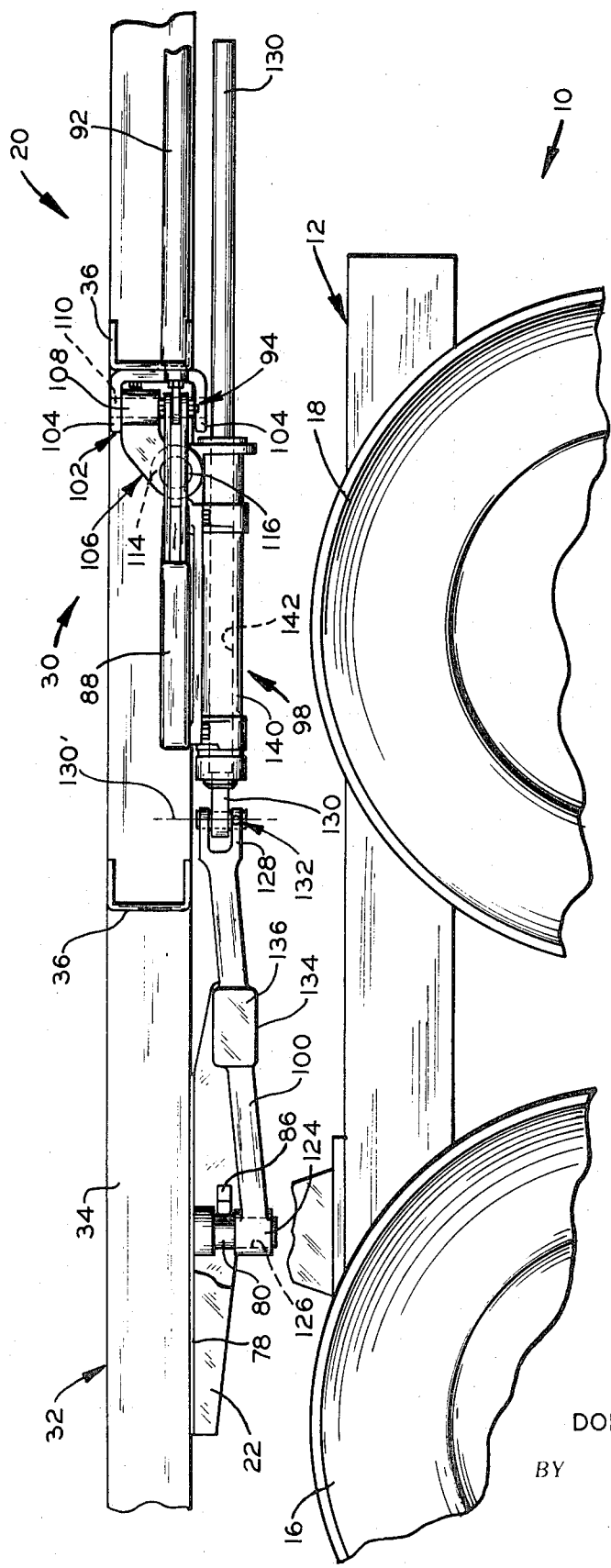

STEERING SYSTEM FOR TRAILERS

BACKGROUND OF THE INVENTION

This invention relates to tractor-trailer vehicles and more particularly to an improved steering system for a trailer having steerable rear wheels.

1. Field of the Invention

Trailer vehicles having steerable rear wheels are known in which a steering system is operatively connected to a tractor to automatically turn the rear wheels upon turning of the tractor. While such an arrangement is desirable to minimize skidding or dragging of the rear wheels across the pavement during sharp turns and to facilitate accurately backing a trailer in a position to be loaded or unloaded at a dock, it is also essential to provide, in such a steering mechanism, some form of limiting means which is effective upon predetermined turning movement of the tractor, to prevent excessive and unsafe turning of the trailer rear wheels.

2. Description of the Prior Art

The prior art, such as U.S. Pat. Nos. 3,048,423, 3,092,398, 3,195,922, 3,533,644, disclose a number of devices for accomplishing this and while some of the proposals have been successful they have been unduly complicated and as a result are expensive not only in their manufacture but also in their maintenance.

SUMMARY OF THE INVENTION.

Stated briefly, the invention comprises interposing a limiting connection in a steering system between the fifth wheel of a tractor and a forwardly located control arm of the steering system. The control arm is adapted to be pivotally supported on the front portion of the trailer and operatively connected to a steerable rear tandem axle assembly by means of longitudinally extending rod elements so that when the tractor turns relative to the trailer, the rear axle assembly will also turn relative to the trailer. The limiting device of the present invention permits the tractor to be turned beyond this point with a reduction in the amount of angular turning of the trailer wheels and comprises a pair of force transferring members in the form of a rod slidably received in a housing, the rod being pivotally connected to a steering member which engages and is rotatable with the fifth wheel of the tractor while the housing is carried by and movable with the control arm; the latter being pivotally connected to the forward part of the trailer. The steering member is disposed within the V-slot of the fifth wheel and is pivotally connected about a vertical axis to a king pin provided on the forward end of the trailer. The longitudinally extending rod elements are spaced on opposite sides of the trailer in parallel relationship and connect the outer ends of the control arm to the outer ends of a second control or follower arm cooperating with the steerable axle assembly, the latter being pivotally connected to the rear of the trailer frame to effect the turning movement of the same about a vertical axis.

OBJECTS OF THE INVENTION

It is, therefore, an object of this invention to provide an improved steering system for a tractor-trailer combination wherein a simple, compact limiting connection permits the tractor to turn relative to the trailer an amount greater than 90° while the steering action of the trailer wheels is limited to a lesser amount.

Another object of this invention is to provide a steering system for a trailer suspension which includes a limiting connection which is adjacent to the trailer fifth wheel and is easily accessible for repair and maintenance.

Other objects and advantages of the invention will become apparent from the following description when considered in connection with the appended claims and the accompanying drawings.

BRIEF DESCRIPTION OF THE DRAWINGS

In the drawings:

FIG. 1 is a partial top plan view of a tractor-trailer combination incorporating the features of the invention;

FIG. 2 is a side elevational view of the tractor-trailer shown in FIG. 1 with the front trailer side rails omitted for clarity;

FIG. 3 is an enlarged plan view of the fifth wheel and its connection to the front control arm;

FIG. 4 is a side elevational view of the structure shown in FIG. 3 but on an enlarged scale.

DESCRIPTION OF THE PREFERRED EMBODIMENT

Attention is now directed to FIGS. 1 and 2 wherein there is shown the rear portion of a tractor 10 having a frame, shown partially at 12, supported in part by a rear tandem axle assembly 14 having suitable ground engaging wheels 16 and 18. In the illustrated embodiment, the frame 12 conventionally mounts a fifth wheel 22 and a trailer 20 has its front end removably supported and connected to the frame 12 by the fifth wheel 22 in a conventional manner while the rear end of the trailer 20 is supported by means of a steerable tandem axle assembly 24. A steering system, shown generally by the reference numeral 30, is provided between the fifth wheel 22 and the steerable tandem axle assembly 24 to interconnect the tractor 10 and trailer for steering the axle assembly 24. The trailer 20 includes a frame 32 having longitudinally extending and laterally spaced side members 34–34 rigidly secured together by a plurality of suitably spaced cross-members 36 with the upper surface of the frame adapted to support the usual flooring (not shown).

REAR STEERABLE AXLE ASSEMBLY

To provide for steering action, provision is made to pivotally mount the rear axle assembly 24 about a vertical axis with respect to the trailer frame 32. For this purpose, adjacent the rear end of the trailer 20, intermediate a pair of cross-members 36, an upper transversely extending somewhat H-shaped pivot support member 38 is secured to the frame 32 for pivotal cooperation about a vertical axis with an intermediate transversely extending rear follower or control arm 44, the latter being supported for pivotal movement about a transverse axis on a lower frame member 45.

More particularly, the support member 38 comprises a pair of longitudinally spaced laterally extending channel shaped cross-members 46 and 47 similar to cross-members 36 and adapted to butt against adjacent cross-members 36 so as to have their leg portions extending in a direction toward one another. The central portion of the support member 38 includes a pair of laterally spaced outer longitudinally extending connecting channels 48–48 and a central longitudinal extending member 49 lying on the longitudinal axis of the trailer 20. The member 49 has rigidly secured thereto intermediate its ends, a vertical downwardly extending pivot post 50 adapted to extend below the support member 38 a sufficient distance so as to be rotatably received in an annular bearing bushing 51 pressed into a central opening 52 provided in the control arm 44, the post 50 acting as a vertical pivot axis. Accordingly, the pivotal mounting means in this instance comprises the vertical post 50 and associate pivot support member 38 and the control arm 44. Also secured to the upper portion of the control arm 44 and encircling the pivot post 50 is an annular bearing ring 53 slightly smaller in diameter than the distance provided between the transversely extending channel members 46 and 47. The central opening portion of this bearing ring 53 rotatably receives a circular bearing plate 54 integrally formed on the lower portion of a support plate 55 supported on and secured to the top side of the lower inwardly directed legs of the longitudinally extending channel members 46 and 47 of the support member 38, thus forming, by means of the bearing ring 53 and circular bearing plate 54, a rotatable connection between the upper pivot support member 38 and the intermediate control arm 44.

To provide additional support for the bearing ring 53 a central longitudinal brace 56 is suitably positioned and secured to the control arm 44 positioned so as to lie along the longitudinal axis of the trailer 20 and have the bearing ring 53 carried by the upper surface thereof. The ring 53 is secured to the brace 56 by means of welding.

The lower frame member 45 is pivotally connected about a transverse axis to the lower portion of the control arm 44 by a transversely extending pin and bracket assembly shown generally at 58. Further, the frame member 45, in plan view, is somewhat H-shaped in configuration and, as best seen in FIGS. 2 and 3, comprises a pair of transversely spaced longitudinally extending members 60 and 62 interconnected by a pair of spaced transversely extending tubular members 64 and 66. The members 60 and 62 serve as mounting means for a pair of axles 68 and 70 which carry the tandem ground engaging wheels 26 and 28 and associate leaf springs 72. Suitably spaced downwardly extending front, intermediate and rear hanger brackets 74 are rigidly secured to the rocking members 60 and 62 for pivotally carrying the free ends of leaf springs 72. Each axle 68 and 70 of the rear axle assembly 24 is secured to the intermediate portions of the leaf springs 72 in a conventional manner as seen in FIG. 2, such as by a U-bolt and clamp plate assembly shown generally at 76. Thus, the axles 68 and 70 are resiliently connected to the H-shaped lower frame member 45 by means of the leaf springs 72 which are pivotally secured at opposite ends to the hanger brackets 74 depending from the frame member 45.

To accommodate the high loads imposed on the components of the rear axle assembly 24, a teflon thrust washer may be inserted between the mating upper and lower bearing contact surfaces on the control arm 44 and pivot support member 38 to provide adequate bearing capacity with low frictional resistance.

Also, if desired, in place of the above type of pivotal means, a standard form of pivotal means consisting of a ball-type turntable can be employed. However, such an arrangement is very much heavier and much more expensive than that shown.

TRAILER CONNECTION

For removably and pivotally connecting the front end of the trailer 20 to the fifth wheel 22 of the tractor 10, a plate 78 is secured to the underside of the frame 32 adjacent the front thereof so as to rest on the upper surface of the fifth wheel 22. A king pin 80 is fixed to the underside of the plate 78 and depends downwardly therefrom into cooperation with an opening 82 formed at the base of a rearwardly directed V-shaped throat or slot 84 formed in the fifth wheel 22. The king pin 80 can be locked in this engaged position in a well known manner such as by locking lugs 86 as seen in FIG. 4.

STEERING SYSTEM

The steering system 30 for the rear axle assembly 24 comprises the transversely extending control or follower arm 44 located at the rear of the trailer and a similar transversely extending control arm 88 located at the forward end of the trailer 20 with a pair of laterally spaced longitudinally extending links or rod elements 90 and 92 operatively connecting the same for simultaneous movement. The rods are substantially parallel to each other and also to the side members 34 while being positioned slightly inwardly of the side members and slightly below the cross-members 36. The undersides of the cross-members 36 can be constructed with cut-outs or relieved portions within the vicinity of the rods 90 and 92 to accommodate the movement thereof during the turning movement of the tractor-trailer in either direction. The front ends of the rod elements 90 and 92 are pivotally connected at 94 to the outer end portions of the forward control arm 88 for movement about a vertical axis while the rear ends of the rods 90 and 92 are pivotally connected at 96 to the outer end portions of the rear follower or control arm 44 for movement about a vertical axis. A limiting connection device 98 connects the front transversely extending arm 88 to a steering member 100 which is engaged in the V-slot 84 on the tractor fifth wheel 22 so as to be rotatable therewith.

Support means is also provided for pivotally connecting the transversely extending arm 88 to the frame 32 for pivotal movement in both a vertical and horizontal direction. To this end a yoke 102 is secured to the forward face of the cross-member 36 immediately behind the arm 88. The yoke 102 has a pair of spaced arms 104–104 extending toward the arm 88 and having suitable openings therein aligned in a vertical direction. An intermediate connecting member 106 forms a connection between the yoke 102 and the transversely extending arm 88. The connecting member 106 has a vertically extending portion 108 positioned between the arms 104–104 of the yoke 102 and pivotally connected thereto by a pin 110 about a vertical axis. The forward end of the connecting member 106 is provided with transversely spaced arms 112–112 between which is mounted a sleeve member 114 pivotally connected thereto about a transverse axis by a pin 116. The sleeve 114 is integral with the central underportion of the arm 88 and accordingly enables the transversely extending control arm 88 to be both vertically and transversely movable with respect to the trailer frame 32 by means of the yoke 102 and connecting member 106.

Additional support may be provided for the longitudinally extending rods 90-92 intermediate their length. In the present invention, this takes the form of a transverse idler link 118 pivotally mounted at 120 for movement about a vertical axis, to an appropriate crossmember 36 at a point on the longitudinal axis of the frame 32. The outer ends of the idler link 118 are pivotally connected at 122 to the rods 90-92 for pivotal movement about a vertical axis.

ACTUATING MEMBER

The actuating or steering member 100, viewed from the top as seen in FIGS. 1 and 3 is somewhat diamond-shaped and has an annular boss portion 124, shown in FIG. 4, provided at the forward end thereof, having an opening 126 therein for encirculing and engaging the depending end of the trailer king pin 80 to thereby pivotally anchor the steering member 100 thereto again, as seen best in FIG. 4. The opposite or rearwardly projecting portion of the steering member 100 is provided with a clevis structure 128 for pivotally receiving the forward end of a rod 130 for movement about a vertical axis by means of a pin connection shown generally at 132.

To avoid looseness in the steering system 30 and consequent "wander," the engagement of the steering member 100 with the fifth wheel 22 should be snug and positive. A satisfactory connection between the steering member 100 and the mating fifth wheel slot 84, is provided by opposed bosses or pads 134 formed on the forward portion of the steering member which provide flat surfaces 136 adapted to engage opposed flat side walls 138 of the V-slot 84. If desired, these pads could be constructed of rubber to eliminate any looseness existing because of possible variations in the mating structures, the rubber pads normally being constructed oversized and compressed as the tractor and trailer are engaged.

Referring now more particularly to FIG. 1, it can be seen that the steering system is actuated by the lever or steering member 100 which engages the V-slot 84 on the tractor fifth wheel 22 and is anchored pivotally to the trailer king pin 80. Thus, turning of the tractor 10 in relation to the trailer 20 causes the steering member 100 to rotate with the fifth wheel 22, thereby actuating the steering system 30 to steer the steerable rear axle assembly 24.

LIMITING CONNECTION

In the present invention, with the dimensional relationship of the various parts being substantially as shown, that is, the distance from the center of the opening 126 in the steering member 100 to the pivot axis 130' of the forward end of the rod 130 being the same as the distance from the pivot axis 130' to the center of the pin 110, when the tractor 10 has turned 60° relative to the longitudinal centerline of the originally aligned tractor and trailer 20, (to the phantom position shown at A in FIGS. 1 and 3) the steerable rear axle assembly 24 will turn 30° from the normal transverse position it assumes when the tractor and trailer are aligned. However, this is the maximum amount of the steering movement of the rear axle assembly 24 with the part proportioned as shown, for as the tractor turns an amount greater than 60° relative to the trailer, (as for example to the phantom position shown at B in FIGS. 1 and 3) the rear axle assembly will be turned to an angle less than 30°. An angular position substantially greater than 90° between the tractor and trailer cannot be attained because physical interference will occur therebetween, and at a 90° tractor to trailer relationship, the rear axle will be at about a 27° steering angle.

The steering relationship between the rear axle assembly 24 and the amount of angular relationship between the tractor 10 and the longitudinal centerline of the trailer 20 is not constant and will vary as the tractor angle increases from 0° to 600°. If a different relationship is desired between the amount of angular deviation of the tractor to trailer centerline and the amount of rear axle steering movement, then the relationship of the distance between the opening 126 and the axis 130' and the distance between the axis 130' and the center of the pin 110 can be varied. If the distance from the opening 126 to the axis 130' is made larger than the distance between the axis 130' and the pin 110, then a greater amount of turning movement of the rear axle assembly will be obtained for a corresponding amount of relative tractor movement up to a greater maximum angle for the rear axle assembly than the 30° shown in the drawings, while if the former distance is made smaller than the latter distance, then a lesser amount of turning movement of the rear axle assembly will be obtained up to a lesser maximum angle for the rear axle assembly than the 30° shown in the drawings.

The limiting connection 98, as best seen in FIGS. 2 and 4, is incorporated between the tractor 10 and trailer 20 to accomplish the above described steering relationship, which is highly desirable under certain parking conditions such as at loading docks, for facilitating turning, backing and other maneuvers normal to the operation of trailers when coupled to tractors. The limiting connection 98 consists of a first force transferring member in the form of the rod 130 and a second force transferring member in the form of the housing 140. The housing 140 is rigidly secured to the underside of the control arm 88 intermediate the ends thereof so as to be aligned with the longitudinal axis of the frame 32 when the tractor and trailer are aligned, and is provided with an opening 142 which slidably receives therein the rod 130. The rod 130 is substantially longer than the housing 140 and projects rearwardly therefrom so that a large amount of forward movement of the rod 130 can take place relative to the housing 140. As the fifth wheel 22, carried by the tractor 10, rotates relative to the trailer, the steering member 100 carries the forward end of the rod 130 therewith. The rod 130 will then pivot the arm 88 while the rod 130 slides outwardly relative to the housing 140 within the opening 142. This relationship is shown in phantom lines in FIGS. 1 and 3, wherein at the position indicated by (A) represents a 60° movement of the tractor relative to the trailer and the position indicated at (B) illustrates a movement of the tractor a small amount more than 90° relative to the trailer.

Conversely, as the tractor moves toward alignment with the trailer, the return rotation of the fifth wheel 22 and steering member 100 carries the forward end of the rod 130 therewith toward its centralized position, and the rod 130 moves the arm 88 toward its transverse position while the rod 130 slides inwardly of the housing 140. The rod elements 90 and 92 transfer the pivotal movement of the arm 88 into the corresponding pivotal, or steering, movement of the rear axle assembly 24 relative to the trailer by means of their connection with the rear follower or control arm 44.

Having described a preferred embodiment of this invention, which fully accomplishes the aims and objects hereinabove set forth, it is readily apparent that many changes can be made therein without departing from the scope of this invention.

I claim:

1. A trailer having a steerable axle for use with a tractor having a fifth wheel comprising; a longitudinally elongated frame including a king pin at its forward end, an axle for said frame disposed rearwardly of said king pin, first means mounting said axle for pivotal movement relative to said frame about a vertical axis, an arm extending transversely of said frame and disposed forwardly of said axle and rearwardly of said king pin and including second means mounting said arm for pivotal movement relative to said frame about a vertical and a transversely extending axis, a pair of longitudinally extending connecting elements with the forward ends thereof being connected to said arm on transversely opposed sides of said second means and the rearward ends thereof being connected to said axle on transversely opposed sides of said first means, each of said connections between said elements and said arm and axle being pivotal about a vertically extending axis, a first force transferring member having a longitudinal axis and, when said axle is disposed transversely of said frame, said longitudinal axis of said first member being aligned with the longitudinal axis of said frame, said first member having a longitudinally extending opening therein bounded by at least opposed lateral sides, a second force transferring member having a longitudinal axis aligned with said first member and disposed in the opening of said first member for relative longitudinal movement and engageable with the laterally opposed sides thereof, one of said force transferring members being connected to said transverse arm for unitary pivotal movement therewith about said vertical axis with the other of said force transferring members extending forwardly therefrom, a steering member adapted for connection to and unitary rotation with the fifth wheel of a tractor which will pull the trailer, and third means connecting said steering member to the forward end of the other of said force transferring members for pivotal movement about a vertically extending axis.

2. A trailer according to claim 1, wherein said connecting elements are laterally spaced and substantially parallel.

3. A trailer according to claim 1, wherein said steering member has a vertical extending opening therein for pivotally receiving said king pin.

4. A trailer according to claim 3, wherein said steering member has a vertical extending opening therein for pivotally receiving said king pin.

5. A trailer according to claim 1, wherein said first force transferring member is connected to said transverse arm, and said second force transferring member is the member connected to said steering member by said third means.

6. A trailer according to claim 5, wherein said first force transferring member has an opening extending axially therethrough and said second force transferring member is an elongated rod telescopically received in said opening.

* * * * *